US006674062B2

(12) United States Patent
Ostromek et al.

(10) Patent No.: US 6,674,062 B2
(45) Date of Patent: *Jan. 6, 2004

(54) METHOD AND SYSTEM FOR GATING A SENSOR USING A GATED POWER SIGNAL

(75) Inventors: Timothy E. Ostromek, Richardson, TX (US); Joseph P. Estrera, Dallas, TX (US); Antonio V. Bacarella, Dallas, TX (US)

(73) Assignee: Litton Systems, Inc., Woodland Hills, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 09/885,675

(22) Filed: Jun. 20, 2001

(65) Prior Publication Data

US 2002/0195547 A1 Dec. 26, 2002

(51) Int. Cl.[7] .............................................. A01J 40/14
(52) U.S. Cl. ................................ 250/214 VT; 313/523
(58) Field of Search ................... 250/214 VT, 214 AL, 250/214 R, 214.1, 214 B, 214 C, 208.4, 206; 313/500, 523–544

(56) References Cited

U.S. PATENT DOCUMENTS

| 3,941,483 A | 3/1976 | Ferrin ........................ 356/152 |
| 3,971,048 A | 7/1976 | Ito et al. .................... 354/60 L |
| 4,047,023 A | 9/1977 | Key et al. ................ 250/214 B |
| 4,659,921 A | 4/1987 | Alfano ................. 250/213 VT |
| 4,694,346 A | 9/1987 | Huston ........................ 358/218 |
| 4,855,590 A | * 8/1989 | Bures et al. ................. 250/221 |
| 4,882,481 A | 11/1989 | Gilligan et al. ........ 250/213 VT |
| 5,146,077 A | 9/1992 | Caserta et al. ......... 250/213 VT |
| 5,227,912 A | 7/1993 | Ho ............................. 359/258 |
| 5,280,167 A | * 1/1994 | Dubois ................. 250/214 VT |
| 5,600,143 A | 2/1997 | Roberts et al. ............. 250/349 |
| 5,747,792 A | 5/1998 | Kintz et al. ........... 250/214 VT |
| 5,756,989 A | 5/1998 | Bear et al. ............ 250/214 VT |

OTHER PUBLICATIONS

U.S. patent application Ser. No. 09/885,639, by Ostromek et al., entitled "Method and System for Gating a Sensor Using a Gated Power Signal".*
PCT International Search Report in International Application No. PCT/US 02/17365, dated Nov. 6, 2002, 5 pages.
PCT, Notification of Transmittal of the International Search Report or the Declaration, International Application No. PCT/US02/17364, 4 pages.
Patent Application Ser. No. 09/885,639 filed Jun. 20, 2001, entitled "*Method And System For Gating A Sensor Using A Gating Signal*," 27 total pages.

* cited by examiner

*Primary Examiner*—Stephone B Allen
(74) *Attorney, Agent, or Firm*—Baker Botts L.L.P.

(57) ABSTRACT

A system (300) for gating a sensor (118) includes a detector (120) that detects light and outputs a signal (102) corresponding to the light. A control unit (334) receives the signal (106), and enables and disables a power supply (314) in response to the signal (106) to generate a gated power signal (316). The power supply (314) outputs the gated power signal (316) to a sensor (118) sensing the light.

22 Claims, 3 Drawing Sheets

METHOD AND SYSTEM FOR GATING A SENSOR USING A GATED POWER SIGNAL

RELATED APPLICATION

This application is related to U.S. patent application Ser. No. 09/885,639, entitled "METHOD AND SYSTEM FOR GATING A SENSOR USING A GATING SIGNAL," Attorney's Docket 019937.0398, filed concurrently with the present application.

TECHNICAL FIELD OF THE INVENTION

This invention relates generally to the field of electro-optical devices and more specifically to a method and system for gating a sensor.

BACKGROUND OF THE INVENTION

Night vision devices enable a user to view a scene with little or no visible ambient light. Law enforcement and military personnel often use night vision devices during night time surveillance and maneuvers. Night vision devices typically employ an image intensifier tube that amplifies light in order to provide an enhanced image to the user.

Gated night vision devices, however, are susceptible to interference associated with oscillatory ambient light, which causes bright flashes of light that interfere with the viewed image. Some systems attempt to avoid the interference by determining the frequency of the ambient light and then using a gating frequency that avoids the interference. A disadvantage of these systems is that interference may occur if the frequency of the ambient light changes. Additionally, these systems may experience interference if the ambient light includes multiple frequencies or does not follow a regular pattern. Consequently, avoiding interference has posed challenges for the design of gated night vision devices and other gated sensors.

SUMMARY OF THE INVENTION

In accordance with the present invention, a method and system for gating a sensor are provided that substantially eliminate or reduce the disadvantages and problems associated with previously developed systems and methods.

According to one embodiment of the present invention, a method for gating a sensor is disclosed. Light is detected, and a signal corresponding to the light is outputted. A power supply is enabled and disabled in response to the signal to generate a gated power signal. The gated power signal is supplied to a sensor sensing the light.

Embodiments of the invention may provide numerous technical advantages. A technical advantage of one embodiment is that the system reduces interference associated with oscillatory ambient light under a variety of lighting conditions in order to improve a resulting image. The system can also respond to changes in the lighting conditions and adjust a gating signal in order to reduce interference. Another technical advantage of one embodiment is that the system reduces interference even if the ambient light includes multiple frequencies or does not follow a regular pattern. Another technical advantage of one embodiment is that the system may be used for a variety of gated sensor applications such as image intensifier tubes, photo multiplier tubes, biased semiconductor sensors, and biased photo voltaic sensors.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 7 of the drawings, like numerals being used for like and corresponding parts of the various drawings.

Figure 1:
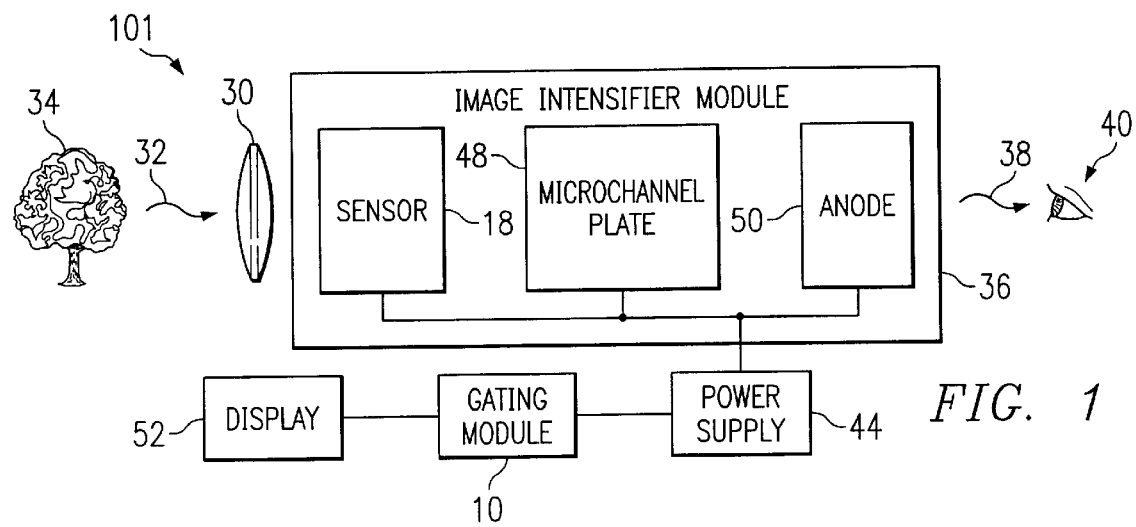
FIG. 1 is a block diagram of one embodiment of a system for viewing an object.

FIG. 1 is a block diagram of one embodiment of a system 101 for viewing an object under low light conditions. System 101 generally includes optics 30 that receive light 32 from a scene that includes an object 34 to be viewed. A gated sensor device, for example, an image intensifier module 36, receives and amplifies light 32 to produce an image 38 of object 34 for a viewer 40. A gating module 10 provides a gating signal that directs a power supply 44 to supply a voltage to image intensifier module 36 that reduces interference while amplifying light 32, thus improving image 38. In one embodiment, gating module 10 and power supply 44 may be integrated at a circuit design level.

In one embodiment, power supply 44 includes a source of electrical power, for example, a battery. Image intensifier module 36 includes a sensor 18, a microchannel plate 48, and an anode 50. Light 32 incident on sensor 18 causes photoelectrons to be emitted in proportion to the intensity of light 32. Microchannel plate 48 multiples the photoelectrons, which flow to anode 50. Anode 50 provides image 38, which is transmitted to viewer 40.

Image intensifier module 36 is gated on and off with a gating frequency $f_g$ to amplify light 32. In one embodiment, sensor 18 is gated. Any construction of sensor 18, microchannel plate 48, and/or anode 50, however, may be gated. When image intensifier module 36 is gated on, light 32 is amplified, and when image intensifier module 36 is gated off, light 32 is not amplified. The gating frequency $f_g$ may be sufficiently high, for example, greater than approximately 30 Hz, such that viewer 40 does not notice the gating. Although image intensifier module 36 is used in this example, any gated sensor device may be used, for example, a photo multiplier tube, a biased semiconductor sensor, or a biased photo voltaic sensor. A display 52 displays information about light 32 to viewer 40.

Light 32 from object 34 may include ambient light with a component that is oscillatory in intensity with a frequency $f_a$, which may interfere with gating frequency $f_g$ at a frequency f as described by the following equation:

$$f = \left\{ \frac{1}{1} f_a, \frac{1}{2} f_a, ... \right\} - f_g$$

An image intensifier module with a fixed gating frequency may avoid interference with ambient light at some frequencies $f_a$, but not at other frequencies $f_a$. This poses a problem because the frequency of ambient light may change with respect to time or location. Additionally, ambient light may include several oscillatory components at different frequencies or may not follow any regular pattern. Unlike systems with fixed gating frequencies, gating module 10 detects light 32 and adjusts the gating frequency, pulse width, and phase of a gating signal, while maintaining proper sensor exposure, in response to the detected light 32 in order to avoid interference with light 32. Accordingly, system 101 reduces interference, thus improving image 38.

Figure 2:
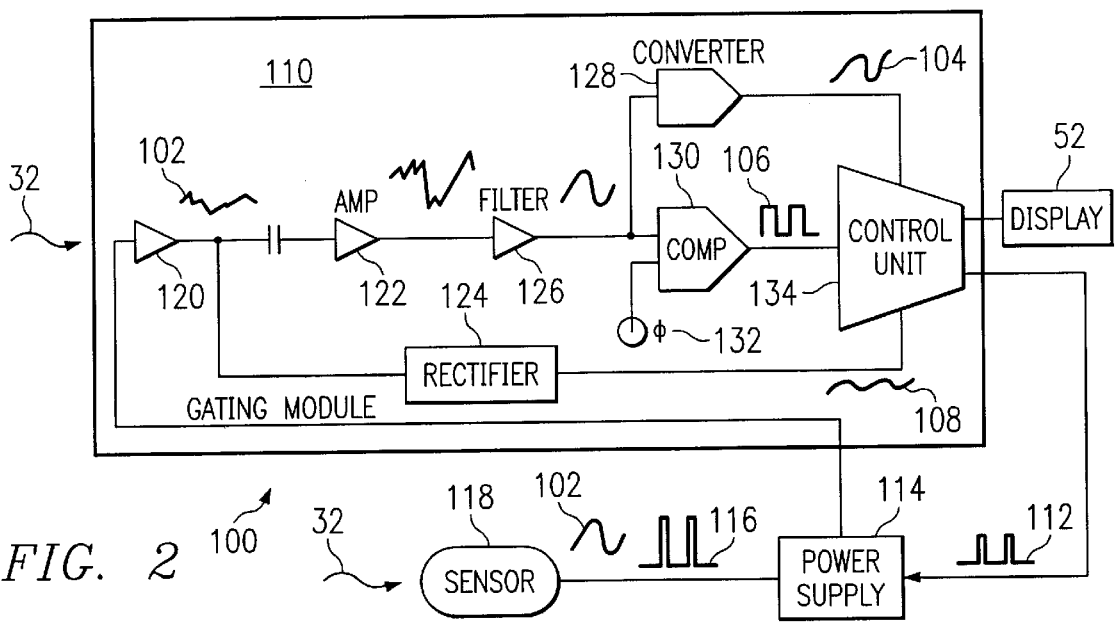
FIG. 2 is a block diagram of one embodiment of a system for gating a sensor.

FIG. 2 is a block diagram of one embodiment of a system 100 for gating a sensor. System 100 includes a gating module 110 that adjusts a gating signal 112 in response to detected light 32 in order to reduce interference. Gating module 110 provides gating signal 112 to a power supply 114, which in turn supplies a gated power signal 116 to a sensor 118. Alternatively, power supply 114 may have its own gating circuit that is triggered by signal 112. Gated power signal 116 gates sensor 118 on and off such that interference is reduced in order to improve image 38. Display 52 displays information about light 32 to viewer 40. The components of system 100 may be either analog or digital or a combination of both, and may operate using circuits, software, or in any other suitable manner.

In one embodiment, power supply 114 provides a high voltage power signal, for example, a signal of approximately 800 volts. Sensor 118 may include a photocathode or any other suitable imaging sensor, such as a charged couple device array or an infrared focal plane array. Gating module 110 includes a detector 120 coupled to an amplifier 122 and a rectifier 124. Detector 120 detects light 32 and outputs a signal 102 corresponding to light 32. Detector 120 may detect light 32 directly or through power supply 114. For example, sensor 118 or microchannel plate 48 may sense light 32 and then transmit signal 102 to power supply 114. Detector 120 receives signal 102 from power supply 114. Rectifier 124 provides information about the intensity of light 32 to control unit 134 by converting an alternating current signal 102 to a direct current signal 108 that corresponds to the intensity of light 32.

Amplifier 122 increases the magnitude of signal 102. A filter 126, which is coupled to amplifier 122, a converter 128, and a comparator 130 (COMP), attenuates or blocks undesirable frequencies of signal 102 in order to filter signal 102. Converter 128 converts filtered signal 102 to a direct current signal 104 that corresponds to the frequency of signal 102 in order to provide frequency information to control unit 134.

Phase controller 132 determines the phase of light 32 at which gating signal 112 is to be synchronized. For example, gating signal 112 may be synchronized with a peak or a valley of the oscillations of light 32. Viewer 40 may adjust the phase using phase controller 132, or phase controller 134 may automatically adjust the phase. Comparator 130, which is coupled to phase controller 132, transforms signal 102 into a waveform signal 106 with a phase determined by phase controller 132.

A control unit 134 receives signals from converter 128, comparator 130, and rectifier 124, and may adjust the frequency, phase, and pulse width of gating signal 112 in response to the received signals in order to reduce interference. Display 52 displays information provided by the received signals, for example, the frequency, phase, and intensity of light 32.

Control unit 134 receives signal 104 corresponding to the frequency of light 32 from converter 128 and adjusts gating signal 112 in response to the frequency information. If the frequency is within a predetermined range, control unit 134 synchronizes gating signal 112 with each oscillation of signal 104. "Each" refers to each of a set or each of a subset of the set. If the frequency is above a predetermined maximum value, for example, 300 Hz, control unit 134 synchronizes gating signal 112 with multiple oscillations of signal 104. If the frequency is under a predetermined minimum value, for example, 10 Hz, control unit 134 synchronizes multiple oscillations of gating signal 112 with each oscillation of signal 104.

Control unit 134 also receives waveform signal 106 corresponding to the phase or phases of component of light 32 from comparator 130 and adjusts the frequency and/or phase of gating signal 112 in response to the phase information. If there is one dominant phase, for example, a phase that composes at least 90% of light 32, control unit 134 adjusts the frequency and phase using frequency information from converter 128, as described above. If there are multiple dominant phases, control unit 134 may select a frequency that is substantially synchronized or best synchronized with the dominant phases. For example, if there are two dominant phases, one with fast frequency oscillations and one with slow frequency oscillations, control unit 134 may select a frequency that is synchronized with approximately 40% of the peak of the fast frequency oscillations and with approximately 30% of the peak of the slow frequency oscillations. If there are no dominant phases, control unit 134 may select a non-phase locked frequency, for example, an optimum frequency of power supply 114.

Control unit 134 receives signal 108 corresponding to the intensity of light 32 from rectifier 124, and adjusts the pulse width of gating signal 112 in response to the intensity information. Pulse width may be increased if the intensity is below a predetermined maximum intensity or decreased if the intensity is above a predetermined minimum intensity. Additionally, the pulse width may be adjusted such that the average intensity received at sensor 118 is maintained at a predetermined optimal intensity for sensor 118. Moreover, control unit 134 may adjust the pulse width to prevent sensor 118 from receiving intensities above a predetermined maximum intensity that may, for example, damage sensor 118.

Information from the received signals may indicate to control unit 134 that light 32 does not provide for synchronization with gating signal 112. For example, light 32 may be random, pulsed, or linearly varying. In response, control unit 134 may generate gating signal 112 that gates sensor 118 on when light 32 is at a predetermined trigger intensity.

In operation, detector 120 detects light 32 and outputs signal 102 representing light 32. Detector 120 may detect light 32 directly or through power supply 114. Amplifier 122 amplifies and filter 126 filters signal 102. Comparator 130 receives signal 102 and outputs waveform signal 106 that includes phase information about light 32. Converter 128 outputs signal 104 that includes frequency information about light 32, and rectifier 124 outputs signal 108 that includes intensity information about light 32. Control unit 134 may adjust the frequency, phase, and/or pulse width of gating signal 112 in response to the input signals 104, 106, and 108. Power supply 114 receives gating signal 112 and provides a gated power signal 116. Gated power signal 116 controls the operation of sensor 118 such that interference with light 32 is reduced, thus improving image 38.

Figure 3A:
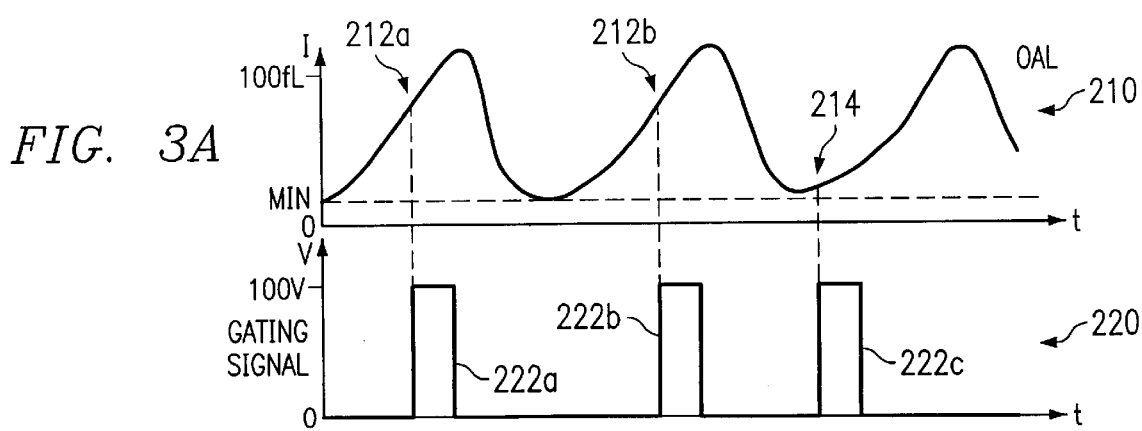
FIGS. 3A and 3B show graphs illustrating the correspondence between the intensity of light and the voltage of a gating signal.

FIG. 3A shows graphs 210 and 220 illustrating the correspondence between the intensity of light 32 and the voltage of gating signal 112. Graph 210 illustrates the intensity of light 32 with respect to time. Graph 220 represents the voltage of gating signal 112 with respect to time. Control unit 134 adjusts gating signal 112 in response to the intensity of light 32 such that appropriate voltage is supplied to sensor 318. Phase controller 132 may be adjusted to allow comparator 130 to shift pulses 222 in accordance with points 212 of the intensity. Pulses 222a and 222b are synchronized with points 212a and 212b, respectively, of a waveform representing light 32. After pulse 222b, the phase changes such that pulse 222c is synchronized with point 214 of the waveform.

Figure 3B:
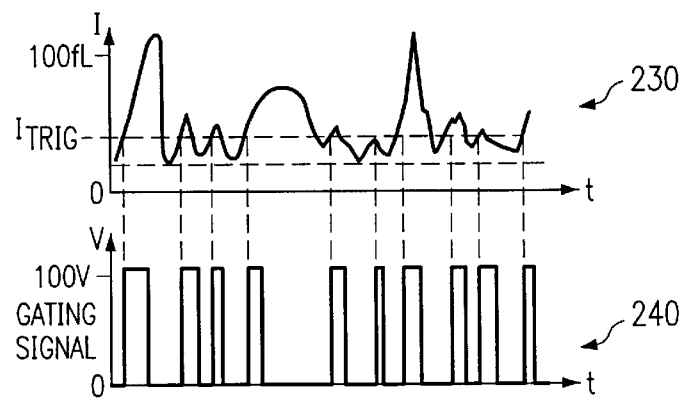

FIG. 3B shows graphs 230 and 240 illustrating a correspondence between the intensity of light 32 and gating signal 112. Graph 230 illustrates the intensity of light 32 with respect to time. Light 32 does not provide for synchronization with gating signal 112. Graph 240 represents the voltage of gating signal 112 with respect to time. Gating signal 112 gates sensor 118 on when phase controller 132 is set at a predetermined trigger intensity to reduce interference, thus improving image 38. Phase controller 132 may be controlled manually or by control unit 134.

Figure 4:
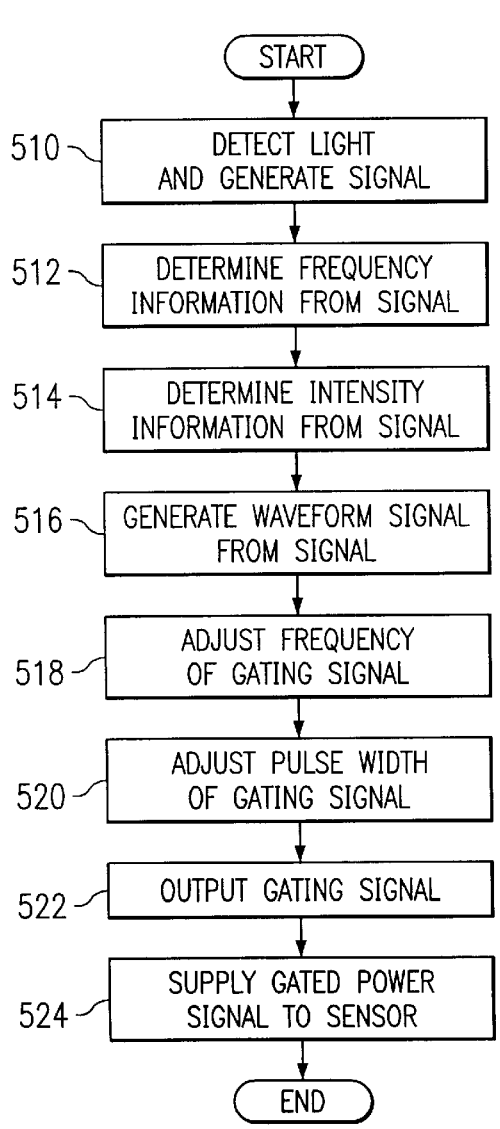
FIG. 4 is a flowchart illustrating one embodiment of a method for gating a sensor that may be used with the system of FIG. 1.

FIG. 4 is a flowchart illustrating one embodiment of a method for gating a sensor using system 100 of FIG. 2. The method adjusts the phase, frequency, and pulse width of gating signal 112 in response to light 32 in order to provide a gating signal 112 to sensor 118 that reduces interference, thus improving image 38.

The method begins at step 510, where detector 120 detects light 32 and outputs signal 102. Signal 102 represents light 32 and provides information about light 32. At step 512, frequency information about light 32 is determined from signal 102. Converter 128, which may comprise a frequency to voltage converter, receives a filtered signal 102 from filter 126, and converts signal 102 to signal 104 that corresponds to the frequency of signal 102. Control unit 134 receives signal 104 from converter 128. Intensity information about light 32 is determined from signal 102 at step 514. Rectifier 124 receives signal 102 and converts signal 102 to signal 108 that corresponds to the intensity of light 32. Control unit 134 receives signal 108 from rectifier 124.

At step 516, waveform signal 106 is generated from signal 102. Comparator 130 receives filtered signal 102 from filter 126, and transforms signal 102 into waveform signal 106 with a phase determined by phase controller 132. Control unit 134 receives waveform signal 106 from comparator 130. The frequency and/or phase of gating signal 112 is adjusted at step 518. Control unit 134 adjusts the frequency and/or phase of gating signal 112 in response to frequency information included in signal 104 and phase information included in waveform signal 106. At step 520, the pulse width of gating signal 112 is adjusted. Control unit 134 adjusts the pulse width of gating signal 112 in response to intensity information from signal 108.

Control unit 134 outputs gating signal 112 to power supply 114 at step 522. At step 524, gated power signal 116 is supplied to sensor 118. Gated power signal 116 gates sensor 118 such that temporal interference is reduced, thus improving image 38. After supplying gated power signal 116 to sensor 118, the method terminates.

Figure 5:
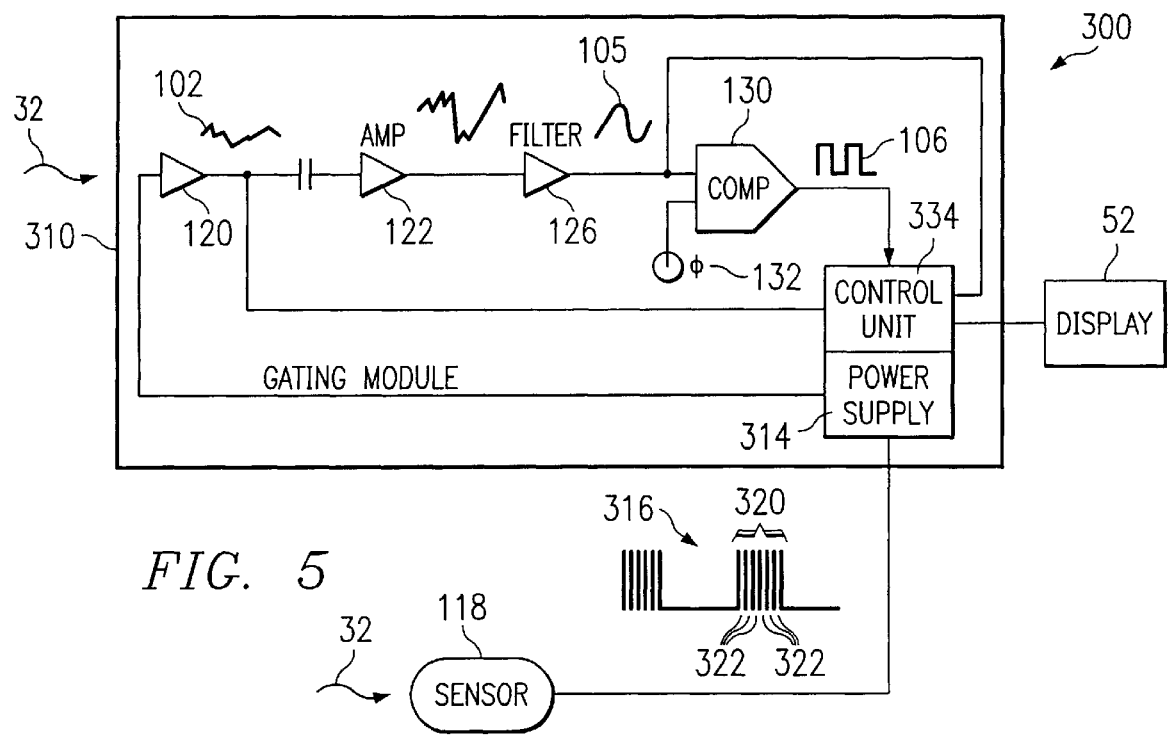
FIG. 5 is a block diagram illustrating another embodiment of a system for gating a sensor.

FIG. 5 is a block diagram illustrating one embodiment of a system 300 for gating a sensor. System 300 includes a gating module 310 that enables and disables a power supply 314 in response to detected light 32. Power supply 314 in turn supplies a gated power signal 316 to sensor 118 that reduces interference with ambient light.

Sensor 118 is described in connection with FIG. 1. Gating module 310 includes detector 120 coupled to amplifier 122 and to power supply 314. Filter 126 is coupled to amplifier 122, to control unit 334, and to comparator 130, which is coupled to phase controller 132. Display 52 is coupled to control unit 334. Detector 120, amplifier 122, filter 126, comparator 130, phase controller 132, and display 52 are described in connection with FIG. 2. The components of system 300 may be either analog or digital or a combination of both and may operate using circuits, software, or any other suitable manner.

Filter 126 outputs a filtered signal 105 that includes frequency information about light 32. Comparator 130 provides waveform signal 106 that includes phase information about light 32. Control unit 334 receives signal 102 from detector 120, filtered signal 105 from filter 126, and waveform signal 106 from comparator 130, and enables and disables power supply 314 to adjust gated power signal 316 in response to the received signals.

Power supply 314 supplies a signal with pulses 322 at a frequency that is greater than the frequency of the ambient light. For example, the frequency of the power signal may be approximately greater than ten times the frequency of the ambient light. As power supply 314 is enabled and disabled, it generates gated power signal 316 with gating pulses 320 that include pulses 322.

Control unit 334 adjusts the frequency, phase, and/or pulse width of pulses 320 of gated power signal 316 in response to phase information provided by waveform signal 106, intensity information provided by signal 102, and frequency information provided by filtered signal 105. Control unit 334 may adjust gated power signal 316 in a manner similar to that as used by control unit 134 of system 100.

In operation, detector 120 detects light 32 and outputs signal 102 representing light 32. Detector 120 may detect light 32 directly or through power supply 114. Amplifier 122 amplifies and filter 126 filters signal 102 to generate filtered signal 105. Comparator 130 outputs form signal 106 with a phase determined by phase controller 132. Control unit 334 receives signal 102 from detector 320, filtered signal 105 from filter 326, and waveform signal 106 from comparator 130, and enables and disables power supply 314 in response to the received signals in order to generate gated power signal 316. Gated power signal 316 gates sensor 318 on and off in a manner that reduces interference with ambient light.

Figure 6:
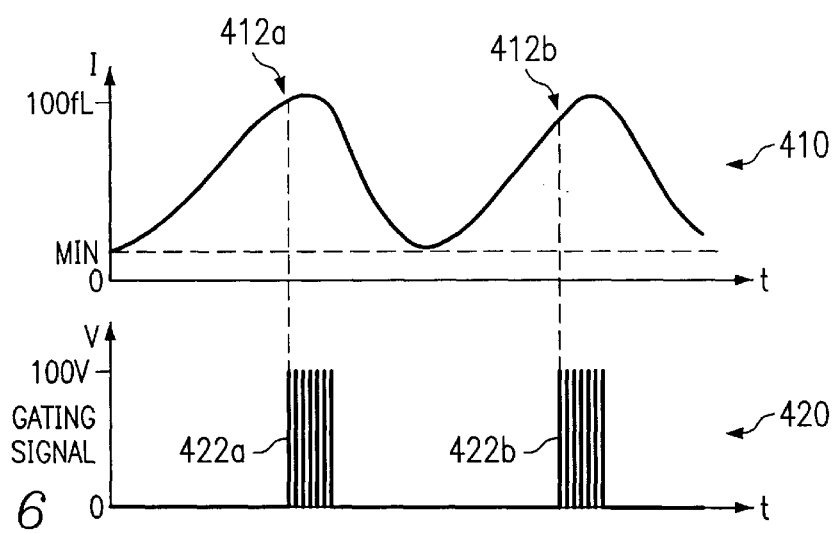
FIG. 6 shows graphs illustrating the correspondence between the intensity of light and the voltage of a gated power signal.

FIG. 6 shows graphs 410 and 420 illustrating the correspondence between the intensity of light 32 and the voltage of gated power signal 316. Graph 410 represents the intensity of light 32 with respect to time. Graph 420 represents the voltage of gated power signal 316 with respect to time. Gated power signal 316 is adjusted in response to the intensity of light 32 in order to reduce interference and enhance image 38. Pulses 422a and 422b are synchronized with points 412a and 412b of a waveform representing light 32.

Figure 7:
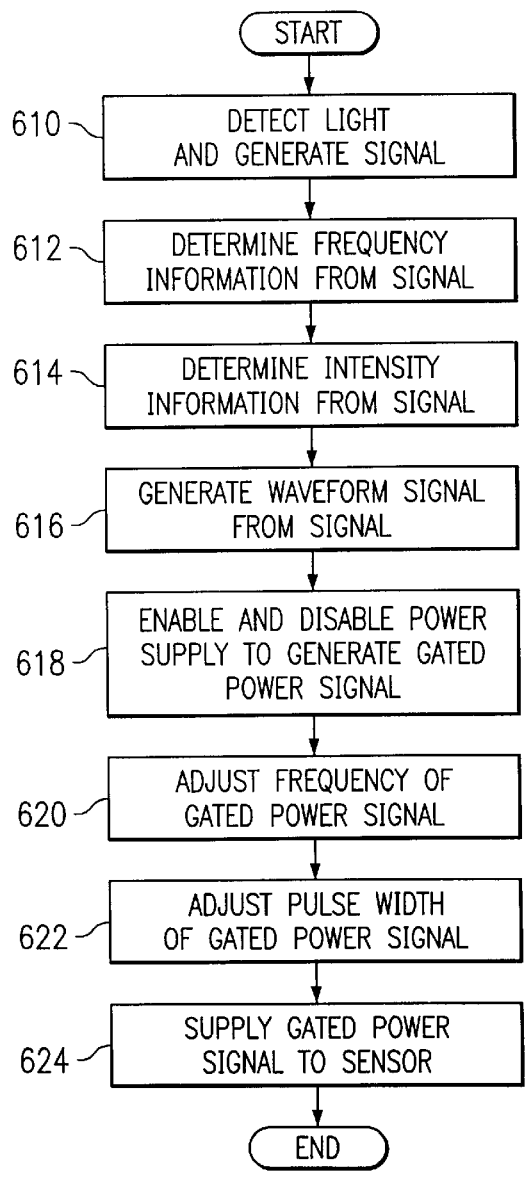
FIG. 7 is a flowchart illustrating one embodiment of a method for gating a sensor that may be used with the system of FIG. 5.

FIG. 7 is a flowchart illustrating one embodiment of a method for gating a sensor using system 300 of FIG. 5. The method enables and disables power supply 314 in response to light 32 such that interference is reduced, thus improving image 38.

The method begins at step 610, where detector 120 detects light 32 and outputs signal 102. Signal 102 provides information about light 32. At step 612, frequency information about light 32 is determined from signal 102. Filter 126 provides filtered signal 105 that includes frequency information to control unit 334. Intensity information about light 32 is determined from signal 102 at step 614. Control unit 334 determines the intensity information from signal 102 received from detector 120. At step 616, comparator 130 receives filtered signal 105 and generates waveform signal 106 from filtered signal 105.

At step 618, control unit 334 enables and disables power supply 314 in order to generate gated power signal 316. Power supply 314 generates pulses 322, and the enabling and disabling of power supply 314 generates gated power signal 316 with gating pulses 320 that include pulses 322.

At step 620, the frequency and/or phase of gated power signal 316 is adjusted. Control unit 134 adjusts the frequency and/or phase in response to frequency information from filtered signal 105 and phase information from waveform signal 106. At step 622, the pulse width of gated power signal 316 is adjusted. Control unit 334 adjusts the pulse width in response to intensity information received from signal 102. At step 624, gated power signal 316 is supplied to sensor 118. Gated power signal gates sensor 118 such that interference is reduced, thus improving image 38. After supplying gated power signal 116 to sensor 118, the method terminates.

Embodiments of the invention may provide numerous technical advantages. A technical advantage of one embodiment is that the system reduces interference associated with oscillatory ambient light under a variety of lighting conditions in order to improve a resulting image. The system can also respond to changes in the lighting conditions and adjust a gating signal in order to reduce interference. Another technical advantage of one embodiment is that the system reduces interference even if the ambient light includes multiple frequencies or does not follow a regular pattern. And yet another technical advantage of one embodiment is that the system may be used for a variety of gated sensor applications such as image intensifier tubes, photo multiplier tubes, biased semiconductor sensors, and biased photo voltaic sensors.

Although an embodiment of the invention and its advantages are described in detail, a person skilled in the art could make various alterations, additions, and omissions without departing from the spirit and scope of the present invention as defined by the appended claims.

What is claimed is:

1. A system for gating a sensor, the system comprising:
a sensor operable to sense light and generate a signal corresponding to the light;
a detector coupled to the sensor and operable to detect the light using the signal;
a control unit coupled to the detector and operable to receive the signal; and
a power supply coupled to the control unit and operable to output a gated power signal to the sensor sensing the light, the control unit operable to:
adjust a signal frequency, a signal phase, and a signal pulse width of the gated power signal in response to the signal; and
enable and disable the power supply in response to the signal to generate the gated power signal.

2. The system of claim 1, wherein:
the signal comprises frequency information about the light; and
the control unit is operable to adjust a frequency and a phase of the gated power signal in response to the frequency information.

3. The system of claim 1, wherein:
the signal comprises intensity information about the light; and
the control unit is operable to adjust a pulse width of the gated power signal in response to the intensity information.

4. The system of claim 1, wherein the detector is operable to detect the light through the sensor.

5. The system of claim 1, wherein the power supply is operable to supply a pulsed signal having a fixed frequency greater than a frequency of the light.

6. The system of claim 1, further comprising a display coupled to the control unit and operable to display information about the light.

7. The system of claim 1, wherein the control unit is operable to enable the power supply in response to a predetermined trigger intensity.

8. A method for gating a sensor, the method comprising:
sensing light at a sensor;
generating a signal corresponding to the light in response to sensing the light;
detecting the light at a detector using the signal;
adjusting a signal frequency, a signal phase, and a signal pulse width of the gated power signal in response to the signal;
enabling and disabling a power supply in response to the signal to generate a gated power signal; and
supplying the gated power signal to the sensor sensing the light.

9. The method of claim 8, further comprising adjusting a frequency and a phase of the gated power signal in response to frequency information about the light, the signal comprising the frequency information.

10. The method of claim 8, further comprising adjusting a pulse width of the gated power signal in response to intensity information about the light, the signal comprising the intensity information.

11. The method of claim 8, further comprising detecting the light through the sensor.

12. The method of claim 8, wherein the power supply is operable to supply a pulsed signal having a fixed frequency greater than a frequency of the light.

13. The method of claim 8, further comprising displaying information about the light.

14. The method of claim 8, further comprising enabling the power supply in response to a predetermined trigger intensity.

15. Software for gating a sensor, the software residing on a computer-readable medium and operable to:
sense light at a sensor;
generate a signal corresponding to the light in response to sensing the light;
detect the light at a detector using the signal;
adjust a signal frequency, a signal phase, and a signal pulse width of the gated power signal in response to the signal;
enable and disable a power supply in response to the signal to generate a gated power signal; and
supply the gated power signal to the sensor sensing the light.

16. The software of claim 15, the software operable to adjust a frequency and a phase of the gated power signal in response to frequency information about the light, the signal comprising the frequency information.

17. The software of claim 15, the software operable to adjust a pulse width of the gated power signal in response to intensity information about the light, the signal comprising the intensity information.

18. The software of claim 15, the software operable to detect the light through the sensor.

19. The software of claim 15, wherein the power supply is operable to supply a pulsed signal having a fixed frequency greater than a frequency of the light.

20. The software of claim 15, the software operable to display information about the light.

21. The software of claim 15, the software operable to enable the power supply in response to a predetermined trigger intensity.

22. A system for gating a sensor, the system comprising:
- a sensor operable to sense light and generate a signal corresponding to the light;
- a detector coupled to the sensor and operable to detect light through the sensor using the signal corresponding to the light, the signal comprising frequency information and intensity information about the light;
- a control unit coupled to the detector and operable to receive the signal;
- a power supply coupled to the control unit and operable to output a gated power signal to gate the sensor sensing the light, the control unit operable to:
  - adjust a signal frequency, a signal phase, and a signal pulse width of the gated power signal in response to the frequency information and intensity information of the signal; and
  - enable and disable the power supply in response to the frequency information and the intensity information to generate the gated power signal; and
- a display coupled to the control unit and operable to display information about the light.

* * * * *